United States Patent [19]
Akki et al.

[11] Patent Number: 6,020,034
[45] Date of Patent: Feb. 1, 2000

[54] PROCESS FOR PRODUCING CORROSION- AND CREEP RESISTANT COATINGS

[75] Inventors: Rashi Akki, New Castle; Basil V. Gregorovich; George K. Kodokian, both of Wilmington, all of Del.; George W. Prejean, Orange, Tex.

[73] Assignee: E. I. du Pont de Nemours and Company, Wilmington, Del.

[21] Appl. No.: 08/970,513

[22] Filed: Nov. 14, 1997

[51] Int. Cl.⁷ .................................. B05D 1/04; B05D 1/22
[52] U.S. Cl. .......................... 427/475; 427/185; 427/195
[58] Field of Search ..................................... 427/185, 182, 427/189, 195, 475

[56] References Cited

U.S. PATENT DOCUMENTS

| | | | |
|---|---|---|---|
| 3,933,954 | 1/1976 | Gebhard, Jr. et al. . | |
| 3,988,288 | 10/1976 | Yamauchi et al. | 427/185 |
| 4,172,912 | 10/1979 | Noji et al. | 427/195 |
| 4,220,675 | 9/1980 | Imazaki | 427/195 |
| 4,739,011 | 4/1988 | Kawata et al. . | |
| 4,774,105 | 9/1988 | Takazawa et al. | 427/195 |
| 4,849,264 | 7/1989 | Pekar et al. . | |
| 5,244,957 | 9/1993 | Best et al. . | |
| 5,264,254 | 11/1993 | Bohnacker et al. | 427/195 |
| 5,290,857 | 3/1994 | Ashida et al. | 525/65 |
| 5,411,809 | 5/1995 | Shalati et al. . | |
| 5,470,893 | 11/1995 | Sinclair-Day et al. . | |
| 5,596,043 | 1/1997 | Harris et al. . | |

*Primary Examiner*—Shrive Beck
*Assistant Examiner*—Bret Chen
*Attorney, Agent, or Firm*—James A. Costello; Sudhir G. Deshmukh

[57] ABSTRACT

This invention concerns a process for imparting corrosion and creep resistance to a coating prepared from a particulate polymer composition and applied from a fluidized bed or by electrostatic spraying over metal substrates. The process of the present invention provides for maintaining the content of acid functionality of an acid-functionalized semicrystalline or acid-functionalized amorphous particulate polymer of the particulate polymer composition within a desired range. The acid functionality on the particulate polymer can be maintained, by crosslinking and/or neutralizing, within a desired range of the acid content which results in imparting corrosion and creep resistance to the coating applied over the metal substrates. Neutralizing the acid functionality of the polymer component results in hardening the coatings resulting therefrom. The process further provides for adding anticorrosive pigments to the composition for further improving corrosion resistance of the resultant coatings.

19 Claims, No Drawings

PROCESS FOR PRODUCING CORROSION- AND CREEP RESISTANT COATINGS

FIELD OF THE INVENTION

This invention relates to particles used for coatings which exhibit improved corrosion, creep and chip resistance, and to a process for effecting these improved properties.

TECHNICAL BACKGROUND

This invention concerns particulate acid-functionalized polymeric compositions designed to impart enhanced corrosion resistance to substrates coated therewith by a fluidized bed process. When the polymers are semi-crystalline, enhanced creep resistance is imparted to the coating layer(s) by controlling both the degree of acid functionality and the degree to which there is crosslinking of the acid functionality. Although it is known to employ polymeric compositions to substrates by a fluidized bed process, such compositions and process have so far had limited success. The limitations have been caused, to a significant extent, by property deficiencies in the polymer-containing particulates employed in the fluidized bed. The particulate compositions, layered and hardened films, and coated substrates described herein and the processes for making and using them overcome the deficiencies that characterize materials known heretofore for use in fluidized bed technologies.

U.S. Pat. No. 4,739,011 discloses the use of a thermoplastic composition for injection molding, whereas the present invention relates to a coating which imparts corrosion resistance.

U.S. Pat. No. 4,849,264 discloses a one coat system that does not provide adhesion to subsequent decorative layers such as found in an automotive coating system as disclosed in the present invention.

U.S. Pat. No. 5,244,957 discloses the use of calcium sulfonate and a terpolymer composition containing acid groups but is not directed to a powder/particle coating composition and does not disclose the need for a select range of acid content for corrosion performance.

U.S. Pat. No. 5,411,809 discloses the use of epoxy/acid/anhydride systems as primer compositions, but does not disclose the importance of controlling the acid content for corrosion performance.

U.S. Pat. No. 5,470,893 discloses the use of a powder coating with both film forming and non-film forming components for specific decorative or performance attributes. However, these powder particles are not the uniformly blended film-formers of this invention with pigments and/or other additives uniformly distributed. Also, corrosion resistance is not disclosed in this patent.

U.S. Pat. No. 5,596,043 discloses the use of a powder coating as a primer in a multilayer system for improved chip performance. Corrosion performance as related to acid composition is not mentioned in this patent. Spherical polymer particles can be made by the procedure taught in U.S. Pat. No. 3,933,954.

SUMMARY OF THE INVENTION

Process A

This invention relates to a process for controlling the anticorrosion and substrate-adherence properties of a coating prepared from a particulate polymer composition and applied from a fluidized bed or by electrostatic spraying, comprising:

i) selecting as the particulate polymer one having acid functionality;

ii) maintaining the acid functionality of the polymer within the range of about 2 to 16 percent based on the weight of the polymer;

iii) preferentially enhancing the anticorrosion property of the coating by maintaining the acid content in the range of about 2 to 9 percent based on the weight of the polymer;

iv) preferentially enhancing the substrate-adherence of the coating by maintaining the acid content in the range of about 5 to 16 percent based on the weight of the polymer; and v) effecting an overall balance of both anticorrosion and substrate-adherence by maintaining the acid content in the range of about 5 to 9 percent based on the weight of the polymer.

This invention also concerns the following preferred embodiments of Process A:

the process of A employing an acid content in the range of about 4 to 12 percent based on the weight of the polymer;

the process of A employing steps i, ii and iii;

the process of A employing steps i, ii and iv;

the process of A employing steps i, ii and v;

the process of A which comprises effecting step ii by hydrolyzing anhydride moieties in the polymer;

the process of A which comprises effecting step ii by capping excess acid;

the process of A which comprises effecting step ii by crosslinking excess acid;

the process of A which comprises effecting step ii by neutralizing excess acid;

the process of A for enhancing the creep resistance of a semicrystalline particulate polymer composition which comprises crosslinking or neutralizing the acid functionality to the extent of at least about 0.5 percent based on weight of the polymer;

the process of A comprising improving the anticorrosion property of the coating by adding at least one anticorrosive pigment;

the process of A wherein the anticorrosive pigment comprises at least one member of the group consisting of $BaSO_4$, zinc phospho oxide complex, and calcium strontium zinc phosphosilicate; and the process of A wherein the anticorrosive pigment is $BaSO_4$ employed at a pigment to binder weight ratio of 2:100 to 30:100.

Composition

This invention further relates to a polymer coating or self-supporting film of at least one layer, comprising acid functionality of between about 2 and 16 percent by weight, said acid functionality being neutralized by exposure to a base or salt solution, to form a salt-hardened surface or interface.

This invention further relates to a substantially spherical polymer particle that imparts anticorrosive attributes when used as a coating or film, comprising a copolymer and at least one member selected from the group consisting of pigment, crosslinker, surfactant, ultraviolet light stabilizer, antioxidant, antiozonant, flow agent and leveling agent, said particle having an acid level of between about 2 and 16 percent by weight of the polymer.

Preferred compositional aspects of this invention include:

a composition that imparts creep resistance to a coating prepared therefrom, comprising a semicrystalline polymer having its acid functionality crosslinked or neutralized to the extent of at least about 0.5 percent by weight of the polymer;

a single layer film of a polymer comprising acid functionality of between 2 to 16 percent by weight;

a multilayer film comprising at least two above-described layers which are crosslinked at their interface;

a multilayer film comprising at least one of said layers ionomer-bonded to another layer of the film;

a composition in the form of a coating or a film whose acid functionality has been neutralized by contact with a source of neutralizing ions; and a substrate coated with one of said described compositions.

DETAILS OF THE INVENTION

Particle Compositions

This invention is directed to particles which can be used as components in coatings and films having good adhesion, corrosion, creep and chip resistance. The particles are comprised of either semicrystalline polymers (e.g., poly(vinyl chloride), polyolefin copolymers, nylons, aramids and the like) or amorphous polymers (e.g., polyesters, polycarbonates, acrylics and copolymers of these, and the like). As used herein, "polymer" includes very low molecular weight materials often referred to as oligomers. By "semi-crystalline" is meant that the polymer has a heat of melting of at least 2 J/g, preferably at least 5 J/g when measured by the Differential Scanning Calorimetry (DSC) using ASTM D3417-83. Such semi-crystalline polymers often contain considerable amounts of amorphous (uncrystallized) polymer. The glass transition temperature, Tg, referred to herein is measured by the method described in ASTM D3417-83 and is taken as the middle of the transition. The Tg described is the highest Tg for the polymer, if the polymer has more than one Tg. If the Tg is undetectable by DSC, Thermomechanical Analysis can be used to determine the Tg, using the same heating rate as is used in DSC. The melting temperature, Tm, of the polymer is taken as the end of melting, where the melting endotherm peak rejoins the baseline, when measured by ASTM D3417-83. An amorphous polymer is one which does not contain crystallinity when measured by DSC, or whose heat of melting is less than 2 J/g. Tg is measured by the same method used for semi-crystalline polymers.

The polymers employed in the process of this invention can be one or more thermoplastics or one or more thermosets, or a combination of both. If more than one polymer is used, the (first) temperature of the substrate should be in the tack temperature gradient of each of these polymers if each of them is to be a significant part of the resulting coating. For fluidized beds, by "tack temperature" (Tt) is meant the substrate temperature just high enough to cause the polymer particles to adhere thereto. The "tack temperature gradient" comprises a temperature range whose lower limit is the tack temperature and whose upper limit is about 75° C. higher, provided it remains below Tm. One skilled in the art will appreciate that Tm has relevance with respect to crystalline and semicrystalline polymers, not amorphous polymers. Accordingly, when an amorphous polymer has been selected as the coating, the important considerations, so far as temperature is concerned, are Tt and tack temperature gradient.

Useful polymers include: thermoplastics such as polyolefins, poly(meth)acrylates [the term (meth)acrylates includes acrylates and methacrylate esters and amides, and acrylic and methacrylic acids], copolymers of olefins and (meth)acrylates, polyamides, polyesters, fluorinated polymers, polyimides, polycarbonates, polyarylates, poly (etherketones), poly(methylpentene), poly(phenylene sulfide), liquid crystalline polymers, polyacetals, cellulosic polymers such as cellulose acetate butyrate, chlorinated polymers such as chlorinated polyethylene, ionomers, styrene(s), and thermoplastic elastomers (below the Tm of the hard segments); and thermosets such as di- and polyhydroxy compounds, monomers, oligomers and polymers including polyacrylates, polymethacrylates, polyethers, polyesters and polyurethanes together with urea formaldehyde, melamine formaldehyde and blocked isocyanate; di- and polycarboxylic acid compounds, monomers, oligomers and polymers including polyacrylates, polymethacrylates, polyethers and polyesters together with epoxy, urea formaldehyde and/or melamine formaldehyde; and epoxy and phenolic compounds, monomers, oligomers and polymers. Preferred polymers are selected from thermoplastic polyolefin polymers and copolymers, poly(meth) acrylates and polyesters, and thermosetting polymers selected from the group consisting of acid-containing polyester/epoxy, hydroxy acrylate/blocked isocyanate or melamine formaldehyde and epoxy-containing acrylate/acid.

Contemplated polymers suitable for preparation as spheres by the process just described include ethylene, propylene, butene-1, pentene-1, hexene-1, heptene-1,3-methylbutene-1, and 4-methylpentene-1. Ethylene is the preferred olefin. The concentration of the $\alpha$-olefin is at least 50 mol percent in the copolymer and is preferred greater than 80 mol percent. Examples of $\alpha,\beta$-ethylenically unsaturated carboxylic acids are acrylic acid, methacrylic acid, ethacrylic acid, itaconic acid, maleic acid, fumaric acid, monoesters of said dicarboxylic acids, such as methyl hydrogen maleate, methyl hydrogen fumarate, ethyl hydrogen fumarate and maleic anhydride. Although maleic anhydride is not a carboxylic acid in that it has no hydrogen attached to the carboxyl groups, it can be considered an acid for the purposes of the present invention because its chemical reactivity is that of an acid. Similarly, other $\alpha,\beta$-monoethylenically unsaturated anhydrides of carboxylic acids can be employed. The preferred unsaturated carboxylic acids are methacrylic and acrylic acids. As indicated, the concentration of acidic monomer in the copolymer is from 0.2 mol percent to 25 mol percent and, preferably, from 1 to 10 mol percent.

The copolymer base need not necessarily comprise a two-component polymer. More than one olefin can be employed to provide the hydrocarbon nature of the copolymer base. The scope of base copolymers suitable for use in the present invention is illustrated by: ethylene/acrylic acid copolymers, ethylene/methacrylic acid copolymers, ethylene/itaconic acid copolymers, ethylene/methyl hydrogen maleate copolymers, and ethylene/maleic acid copolymers, etc. Examples of tricomponent copolymers include: ethylene/acrylic acid/methyl methacrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene, methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, and ethylene/chlorotrifluoroethylene/methacrylic acid copolymers.

In addition to the third monomer component of the copolymer stated above, additional third monomeric components can be an alkyl ester of an α,β-ethylenically unsaturated carboxylic acid of 3 to 8 carbon atoms where the alkyl radical has 4 to 18 carbon atoms. Particularly preferred are the terpolymers obtained from the copolymerization of ethylene, methacrylic acid, and alkyl esters of methacrylic acid or acrylic acid with butanol. The concentration of this optional component is 0.2 to 25 mol percent, based on the weight of copolymer, preferably from 1 to 10 mol percent. Representative examples of the third component include n-butyl acrylate, isobutyl acrylate, sec-butyl acrylate, t-butyl acrylate, n-butyl methacrylate, isobutyl methacrylate, sec-butyl methacrylate, t-butyl methacrylate, n-pentyl acrylate, n-pentyl methacrylate, isopentyl acrylate, isopentyl methacrylate, n-hexyl acrylate, n-hexyl metacrylate, 2-ethylhexyl acrylate, 2-ethylhexyl methacrylate, stearyl acrylate, stearyl methacrylate, n-butyl ethacrylate, 2-ethylhexyl ethacrylate. Also, the third component includes mono- and di-esters of 4 to 8 carbon atom di-carboxylic acids such as n-butyl hydrogen maleate, sec-butyl hydrogen maleate, isobutyl hydrogen maleate, t-butyl hydrogen maleate, 2-ethyl hexyl hydrogen maleate, stearyl hydrogen maleate, n-butyl hydrogen fumarate, sec-butyl hydrogen fumarate, isobutyl hydrogen fumarate, t-butyl hydrogen fumarate, 2-ethylhexyl hydrogen fumarate, stearyl hydrogen fumarate, n-butyl fumarate, sec-butyl fumarate, isobutyl fumarate, t-butyl fumarate, 2-ethylhexyl fumarate, stearyl fumarate, n-butyl maleate, sec-butyl maleate, isobutyl maleate, t-butyl maleate, 2-ethylhexyl maleate, stearyl maleate. The preferred alkyl esters contain alkyl groups of 4 to 8 carbon atoms. The most preferred contain 4 carbon atoms. Representative examples of the most preferred esters are n-butyl acrylate, isobutyl acrylate, n-butyl methacrylate, isobutyl methacrylate, t-butyl acrylate, t-butyl methacrylate. The preferred base copolymers are those obtained by the direct copolymerization of ethylene with a monocarboxylic acid comonomer and can be neutralized or not neutralized. It is preferred that substantially spherical particles be employed in the disclosed process said particles comprising the base copolymers and the various additives found to lend desirable properties to the finish coatings.

One preferred semicrystalline polymer system is that of poly(ethylene-co-methacrylic acid), commercially available as Nucrel® from DuPont Co., Wilmington, Del. U.S. Pat. No. 4,351,931 discloses the process for making such copolymers.

Anticorrosivity

The amorphous and semicrystalline particles of this invention are rendered anticorrosive in nature by controlling the level of acid present in the particle, as well as the melt index. By "melt index" is meant the mass rate of flow of polymer through a specified capillary under controlled conditions of temperature and pressure. (See F. W. Billmeyer, Jr., Textbook of Polymer Science, Interscience Publishers, New York, 1962, p. 175.) The melt index was determined for the materials used herein by ASTM D-1238, using a 2160 g load at 190° C., with values reported in grams per 10 minutes. By "acid level" is meant the weight percent of acid-containing monomer per the total weight of the polymer. By "acid functionality" is meant that there exists, as part of the polymer, a chemical group which will impart acid nature to the polymer, and the amount of functionality is expressed in terms of percent by weight of the total polymer. By "acid-precursor functionality" is meant that there exists, as part of the polymer, a chemical group which can be converted to an acid functional group by conventional means (e.g., hydrolysis, etc.). The acid level of the polymer can be adjusted to the desired level by one or more of the following methods: hydrolyzing an anhydride if present; capping excess acid; crosslinking excess acid; and adding more acid functionality. When the acid level is adjusted by crosslinking, the creep resistance can also be affected as will be subsequently discussed.

The acid groups can be neutralized using various bases or ionic salts, including zinc acetate, aluminum acetylacetonate, lithium acetate, sodium hydroxide and sodium acetate. However, it should be noted that there are other uncomplexed metal ions which are suitable in forming the ionic copolymers of the present invention. These include mono-, di- and trivalent ions of metals in Groups I, II, III, IV-A and VIII of the Periodic Table of Elements (see page 392, Handbook of Chemistry and Physics, Chemical Rubber Publishing Co., 37th ed.). Uncomplexed monovalent metal ions of the metals in the stated groups are also suitable in forming the ionic copolymers of the present invention with copolymers of olefins and ethylenically unsaturated dicarboxylic acids. Suitable monovalent metal ions are $Na^+$, $K^+$, $Li^+$, $Cs^+$, $Ag^+$, $Hg^+$ and $Cu^+$. Suitable divalent metal ions are $Be^{2+}$, $Mg^{2+}$, $Ca^{2+}$, $Sr^{2+}$, $Ba^{2+}$, $Cu^{2+}$, $Cd^{2+}$, $Hg^{2+}$, $Sn^{2+}$, $Pb^{2+}$, $Fe^{2+}$, $Co^{2+}$, $Ni^{2+}$ and $Zn^{2+}$. Suitable trivalent metal ions are $Al^{3+}$, $Sc^{3+}$, $Fe^{3+}$ and $Y^{3+}$. Preferably, $Zn^{2+}$ and $Al^{3+}$ ionic salts are used. As used in the examples below, ZnAc or ZNAC represents zinc acetate, and AlAcAc or ALACAC represents aluminum acetylacetonate.

The corrosion resistance of a coating is generally tested by exposure to a corrosive environment. Naturally-occurring corrosive environments include, but are not limited to, ocean spray, road salt and acid rain. Testing environments include humidity cabinets, salt spray and salt mist cabinets and the like.

Creep Resistance

It has also been found that the anticorrosive coatings made from the semicrystalline-based particles are creep or shrink resistant, when they are crosslinked. By creep or shrink resistant is meant that the coating which is applied substantially retains its initial dimension, and maintains good adherence to any substrate, coating or other layer to which it is applied or with which it is in contact. The creep resistance can be intracoat-induced in nature, and affected by crosslinking through acid and/or other functionality within a monolayer. Generally, the starting acid level in the polymer particle is between 2.5 and 24 percent, preferably between 5 and 15 percent and most preferably between 6 and 12 percent. At least 0.5 percent by weight of this acid functionality is used up by the crosslinking, so that the final acid levels after the crosslinking occurs fall within the levels needed for both creep and corrosion resistance. Coatings with crosslinking character can be used as any part of a coating system, but a preferred use is as a primer for direct-to-metal coating and corrosion resistance. Preferred application of the coatings described herein is by fluidized bed or electrostatic spraying but it should be understood that applications by other methods are possible and the process of this invention encompasses application by any method even though "fluidized bed" and "electrostatic spraying" methods are the only methods discussed by name (for the sake of simplicity and brevity).

Another way to achieve creep-resistant coatings with these particles is to design the semicrystalline polymers so that, when used as part of a multilayer coating, they crosslink at the coating interface(s), allowing intercoat adhesion. The acid groups present react with epoxies, isocyanates, hydroxyls and the like, and the reactive moieties can be within the same coating layer, or in layers which share an interface, or both.

Because the intercoat adhesion is relatively strong, the formation of self-supporting film sandwiches can also be accomplished in ways that will be obvious to one skilled in the art.

Ionomer bonding at the coating layer interface(s) can also be accomplished by neutralizing the surface of the coating layer as described above, preferably using $Zn^{2+}$ or $A^{3+}$ ionic salts.

Another way to improve creep resistance is to neutralize these semi-crystalline coatings by dipping the coated article in a salt solution. Various ionic solutions can be used, but $Al^{3+}$ or $Zn^{2+}$ solutions are preferred. A gradient of ionomeric species is formed from the outer surface down toward the substrate, with the greatest amount of ionomeric species on the outer surface. The gradient rate and amount depends on the ionic solution used. Generally, between about 1 and 40 percent of the original acid level is neutralized, and preferably between about 5 and 20 percent. This produces a "salt-hardened" coating, wherein the top layer of the unilayer or multilayer semicrystalline coating is the reaction product of the acid functionality present. The coatings do not necessarily need to be crosslinked, as this "hardening" will occur on both crosslinked and non-crosslinked coatings. One of the most significant results of this dipping and subsequent neutralizing is the significant increase in gravelometer readings which are indicative of chip resistance of the coating. Generally speaking, coatings formed by the teaching of this invention show an increase in the gravelometer rating by at least one level versus the rating of an unneutralized coating or prior art coating, 10 being the highest rating possible.

Supported Coatings

Particles are generally applied to substrates either by electrostatic spraying or fluidized bed coating. While both are known to those skilled in the art, application by fluidized bed is preferred, and the procedure to do so is as follows.

The substrate can be any object that is substantially chemically stable at the operating temperature(s) of the coating process. It is preferred that the object also be dimensionally stable at the operating temperature(s) and times to avoid any dimensional changes such as those caused by melting or warping. The substrate can be coated with one or more other coating layers before coating by this process. For instance, a corrosion resistant and/or primer layer and/or a metal layer such as zinc (galvanized) can be employed. Preferred substrates are metals and plastics. Preferred metals are iron, steel, galvanized steel, electrogalvanized steel (one and two sides), phosphate-treated steel, electrogalvanized steel which is phosphate-treated, aluminum, and phosphate-treated aluminum. Preferred plastics are composites and compacted fibrous structures, and fluoropolymers such as Kapton® and Tedlar®. Optionally, the fluidized bed can be vibrated to assist in particle fluidization.

The temperature of the substrate as it enters the fluidized bed of polymer particles is within the tack gradient when a thin coating is desired. Generally speaking, the temperature of the substrate will decrease toward the temperature of the fluidized bed, when the substrate is in the fluidized bed. The temperature of the fluidizing gas in the fluidized bed is below the tack temperature to avoid agglomeration of polymer particles before their contact with the heated substrate.

The coating is applied in a fluidized bed of polymer particles which are fluidized by the passage of a gas though the particles so as to form a reasonably uniform fluid mass. It is preferred that the polymer particles in the fluidized bed are not electrostatically charged to a degree that will cause their adherence to the substrate when the substrate is below tack temperature. A coherent and substantially continuous coating will usually have a thickness of at least about 5 micrometers. Preferred coatings of this invention are those described herein as "thin". Such coatings are from about 5 to 150 micrometers thick, preferably no more than about 75 micrometers and more preferably no more than 60 micrometers. Thicker coatings of between 150 to 300 micrometers utilizing the process of this invention are certainly possible but are less preferred.

Preferably, about eighty percent by weight of the coating particles are in a size range of about 10 micrometers to 80 micrometers, more preferably about 20 micrometers to 60 micrometers. It is most preferred that at least 90 weight percent of the polymer particles be in these size ranges. Substantially no particles will be larger than 200 to 250 micrometers. The particle size of the polymer is measured by the general technique described by Heuer, et al, Part. Charact., Vol. 2, pages 7 to 13 (1985). The measurement is made using a Vario/LA Helos analyzer available from Sympatec, Inc., 3490 U.S. Route 1, Princeton, N.J. 08540, U.S.A., using the volume percent measurement.

After removal from the fluidized bed, the coated substrate can be heated above the tack temperature gradient of the polymer to level the coating and effect cure if it is a thermosetting polymer. This is carried out in a typical heating apparatus such as a convection or infrared oven. If the polymer is thermosetting, it is preferred that substantial curing not take place before leveling has taken place. The time required for leveling will depend on the particle size, distribution, thickness, temperature used and the viscosity of the polymer. Higher temperatures and lower polymer viscosities favor faster leveling.

One advantage of this coating process is the ability to obtain relatively thin uniform coatings without the need for electrostatic or other forces to assist in adhering the polymer to the substrate. More uniform coverage of irregular and "hidden" surfaces is normally achieved by this method than by electrostatic methods. This more uniform coverage is attributed to control of particle size and particle size distribution as described herein, as well as the lack of inhibitory Faraday cage effect in an electrically charged system.

The coatings produced by the instant process are useful to impart corrosion resistance, chemical resistance, and other properties such as will readily occur to one skilled in the art. They can act as primers for a subsequent coating layer and/or provide pleasing aesthetic properties such as color, smoothness, and the like. To provide such advantages, it can be useful to include with or within the polymer particles other materials employed in polymer coatings such as fillers, reinforcers, pigments, colorants, antioxidants, corrosion inhibitors, leveling agents, antiozonants, UV screens, stabilizers, and the like. In many instances, coating attributes depend on good adhesion of the polymer coating to the substrate. Such adhesion can often be improved by commonly known methods such as use of a primer, cleaning of the substrate surface, chemical treatment of the substrate surface and/or modification of the chemical makeup of the coating being applied. In this latter category, for instance, when coating directly on metal, adhesion can often be improved by including polar groups in the coating polymer, such as carboxyl or hydroxyl groups. One or more surfaces of the substrate can be coated, as desired, by controlling immersion conditions.

The coatings applied by the process of this invention are useful in many applications, such as the coating of coil stock, automotive, truck and vehicle bodies, appliances, ceramic parts, plastic parts, and the like. For instance, for automotive bodies, the coatings can be applied directly onto the metal surface or a primer can be applied first. The coated body is thereby protected from corrosion and physical damage. One or more coating layers of typical finish coats such as a so-called (usually colored) basecoat, and then a clearcoat can be applied. Care should be taken to insure adequate adhesion between the various coats, and between the polymer coat and the metal body. Coating applications by the instant process can be relatively thin and uniform for good corrosion protection, while at the same time not adding much weight to the vehicle, nor using too much relatively expensive polymer. In addition, the coating will be smooth and uniform when measured, for instance, by a profilometer. This process gives substantially void-free coatings.

Generally, the temperature of the substrate (and any polymer coated on it) will decrease toward the temperature of the fluidized bath, when the substrate is in the fluidized bed. Preferred operating conditions include substrate temperatures of about 20° C. or more above Tt, not significantly exceeding about 40° C. or more above Tt (but below Tm). The temperature of the substrate as it enters the fluidized bed (at a temperature above the tack temperature) together with the appropriate size selection of coating particles largely governs the coating thickness independent of time, after a critical minimum dip time in the fluidized bed.

We have found that thin coatings can be obtained substantially independently of time (after a minimum residence time) utilizing the process of this invention. This is achieved by preheating the substrate within the tack temperature gradient, preferably close to the tack temperature, Tt, and controlling particle sizes as described. When these variables are controlled within the teaching of this invention, increasing residence in the fluidized bed has little or no effect on coating thickness. The benefits of this invention are most important when dipping intricate objects or very large objects such as vehicle bodies. Without the benefits of this invention, dipping intricate objects for relatively long periods of time to achieve some coverage of all surfaces would produce too-thick coatings, and dipping large objects to achieve desirable thin coatings would produce nonuniform coating thicknesses.

The process for making spherical particles comprises shearing in a closed shear zone of a shear device under positive pressure water, ammonia and copolymer of α-olefins of the formula R—CH=CH$_2$, where R is a radical of hydrogen or an alkyl radical having from 1 to 8 carbon atoms, and α,β-ethylenically unsaturated carboxylic acids having from 3 to 8 carbon atoms. The copolymer is a direct copolymer of the α-olefins and the unsaturated carboxylic acid in which the carboxylic acid groups are randomly distributed over all molecules and in which the α-olefin content of the copolymer is at least 50 mol percent, based on the α-olefin-acid copolymer. The unsaturated carboxylic acid content of the copolymer is from 0.2 to 25 mol percent, based on the α-olefin-acid copolymer, and any other monomer component optionally copolymerized in said copolymer is monoethylenically unsaturated. A temperature is employed that is above the melting point but below the thermal degradation point of the polymer to form a homogeneous slurry wherein the polymer particles have an average particle size of less than 100 microns in diameter, the slurry containing at least 0.6 percent by weight ammonia and up to 50 percent by weight of said polymer; after completion of shearing, maintaining the slurry with agitation at a temperature above the polymer melting point for at least 0.5 minute until essentially all the polymer particles become spherical; while continuing agitation cooling the slurry to a temperature below about 80° C. in a period of at least 0.3 minute, the pressure maintained being sufficient to keep the water in the liquid state; simultaneous with or subsequent to cooling the slurry reducing the pressure of said cooled slurry to atmospheric pressure; and separating the polymer particles. The partially spherical-shaped particles have an average diameter of 10 to 100 microns and are characterized in that the surface of the particles can be rough and/or covered with hemispherical bumps about 0.1 micron in diameter, or with "dimples".

Unsupported Coatings/Films

The particulate compositions of this invention can be used to make self-supporting monolayer and multilayer films. Typically, the particles can be coated onto a dimensionally stable substrate to which a release agent has been applied and heated and cured to the desired layer thickness. The layer is then removed from the substrate and used as such or contacted with one or more other layers prepared in the same way or by any procedure known in the art to produce films. The functionality of the film layers that can be produced from the particulate compositions of this invention will lend desirable properties to films intended for use in food packaging and for other end uses in which the acid-functional polymer component of a first layer can be crosslinked into a second contacting layer to improve adherability, gas impermeability, and the like.

Alternatively, the acid-functionality can be utilized in any other manner that will be obvious to one of ordinary skill in the art based on the disclosure presented herein. For instance, improved properties can be achieved for the final end use by neutralizing the acid moieties on or beneath the layer's surface; or, the acid groups can be bonded via ionomer bonding mechanisms, and the like. The neutralizing agent or ionic bonding component can be applied by dipping the acid-functionalized layer thereinto or can be incorporated onto the surface of a complementary layer which is then brought into contact with the first layer to complete the reaction and form an adventitious bond. Other potential uses for the monolayer and sandwich films made according to the disclosure of this invention include food and article packaging, high strength/low elongation films, and the like.

Adjuvants for Anticorrosivity

Still another facet of this invention is the enhancement of anticorrosive properties by the addition of pigments to the coating system. Using the compositions as described above, pigments such as Nalzin®2, preferably Halox® and most preferably BaSO$_4$ greatly enhance the corrosion resistance of the coatings as shown in the Examples below. Again, crosslinking can take place both within and between the applied coatings, but is not necessary for increased corrosion resistance. The coatings can be applied to any kind of substrate, although metals are generally used and preferred.

In certain cases, the pigment-to-binder ratio (P/B) is critical. Preferred P/B's for BaSO$_4$ are 2:100 to 30:100, and for Nalzin®2 and Halox® are 0.5:100 to 10:100.

Procedures

Vibration of substrate(s) when employed was applied at 1000 to 2000 Hz with about 90 Newtons of force. The vibrator was mounted onto the part being dipped. The vibrator is a Vibco VS100®. The spherical particles described herein are "substantially spherical", that is, they have a smooth radius of curvature and almost no sharp edges such as characterize particles that are made by cryogenic grinding. One skilled in the art will appreciate that the substrates coated by the process of this invention can be pretreated or post-treated with various heating techniques including gas, electric, microwave, dielectric, infra-red, and the like.

Tape Adhesion Test

The adhesion of the applied coatings was tested via a tape adhesion test based on the method described in ASTM D3359-95a. Briefly, cross-hatch grids are cut into the coating, a piece of tape is firmly applied to the cross-hatched area, and the tape quickly removed in a motion perpendicular to the paint film. The adhesion of the coating is rated, and is relative to the amount of the coating that is removed by the tape. The classifications are 0, <5 percent, 5–15 percent, 15–35 percent, 35–65 percent and 65 percent. The lower the value, the better the adhesion rating.

Chip Resistance of Coating

The chip resistance of the applied coatings was evaluated using a gravelometer (Gravel.). The panels were taken from the freezer at −20° C., placed in a gravelometer (Q Panel, Model QGR, Cleveland, Ohio), and gravel fed at a rate of 1 pint of stones in 20 sec. Generally, these panels had been exposed to 96 hours humidity as described below. The panels were rated from 0 to 10, after comparison to the pictorial standards commonly used. Generally, the higher the number, the lower the number of chips in the coating. The "point of failure" is also noted, and is described in the table below.

| Notation | Level of Failure | Failure Type* |
|---|---|---|
| S/P | Substrate to Primer | Adhesive |
| S/T | Substrate to Topcoat | Adhesive |
| P | Primer | Cohesive |
| P/T | Primer to Topcoat | Adhesive |
| T | Topcoat | Cohesive |
| P/P | Primer to Primer | Adhesive |
| S | Substrate | Cohesive |

*By "adhesive" is meant interlayer failure. By "cohesive" is meant intralayer failure.

Corrosion

The corrosion performance of the materials was tested using the salt mist cyclic test method. Cold rolled steel (CRS) panels treated with zinc phosphate (Code: APR 12936, ACT Laboratories, Hillsdale, Mich.) were coated by fluidized bed application, to a thickness of 25 μm±12.5 μm.

After scribing, the panels were exposed to the following set of conditions for the specified time in a Q-Fog Cyclic Corrosion Tester, Model No. CCT600, Q-Panel Lab Products, Cleveland, Ohio. The reported corrosion measurement represents the measurement in mm of the distance that the coating is scraped from the panel.

Step 1: Subcycle steps 2–3 and repeat 4 times
Step 2: Salt mist at 25° C. for 15 minutes.
Step 3: Dry off at 25° C. for 75 minutes.
Step 4: Dry off at 25° C. for 120 minutes.
Step 5: 100 percent relative humidity (RH) at 49° C. for 8 hours.
Step 6: Dry off at 60° C. for 7 hours.
Step 7: Dry off at 25° C. for 1 hour.

Humidity Test

The effect of humidity (100 percent relative humidity with condensation on the test specimens at all times) was tested using the apparatus described in ASTM B1117. The examples included herein were tested in a Harshaw Humidity Cabinet, Model 24, Cleveland, Ohio. The prepared panels were placed in the chamber for 96 hours at 100 percent RH and at 38° C. Finish degradation was evaluated in terms of tape adhesion and corrosion.

Creep Test

The amount of creep of the coating was measured from the edge of the panel to the edge of the coating, and is reported as "shrinkage" in mm.

Definitions

Unless otherwise specified, all chemicals, materials and reagents were used as received from Sigma-Aldrich Chemical Co., Milwaukee, Wis.

| MATERIAL | CHEMICAL NAME |
|---|---|
| Nucrel ® | Poly(ethylene-co-methacrylic acid) (DuPont Wilmington, DE |
| Bisphenol A epoxy 4,4'-(1-methylylidene)-bis-1,1'-oxypropyloxirane-2,3 | Ciba-Geigy, Hawthorne, NY |
| Epoxies: | |
| From Ciba-Geigy Co., Plastics Division, Hawthorne, NY | |
| Araldite ® GT7013 | Phenol,4,4U-(1-Methyl ethylidene) Bis-, polymer with (chloromethyl)oxirane (BPADG) |
| Araldite ® GT7097 | Phenol,4-(1,1-Dimethyl ethyl)-polymer with (chloromethyl)oxirane and 4,4U-(1-methyl ethylidene) Bis(phenol) |
| Araldite ® GT6703 | Phenol,4-(1,1-Dimethyl ethyl)-polymer with (chloromethyl)oxirane and 4,4U-(1-methyl ethylidene) Bis(phenol) |
| TGIC | 1,3,5-triglycidyl isocyanurate |
| Pigments: | |
| BaSO$_4$, Barium Sulfate | Sachtleben Chemie Gmbh c/o The Ore +Chemical Co., New York, NY |
| TiO$_2$, Titanium dioxide pigment | DuPont Co., Wilmington, DE |
| Zinc phospho oxide complex (Nalzin ® 2) | Rheox, Inc., Hightstown, NJ |
| Calcium strontium zinc phosphosilicate (Halox ®) | Halox Pigments, Hammond, IN |
| Catalysts from Sigma-Aldrich Chemical Co., Milwaukee, WI: | |
| TBPB | tetrabutyl phosphonium bromide |

Materials and Processing of Top Coats

Unless otherwise specified, when Examples are labeled "coated", this means that the substrate which is coated with a film prepared from the particles of this invention is also coated with a primer-surfacer (PS), base coat (BC) and clear coat (CC). This is generally shown as coated with PS/BC/CC. These coatings are conventionally applied with dry film thicknesses (DFT) as shown below.

PS—pigmented polyester melamine, sprayed, cured for 30 min @ 302° F.; ~25 µm DFT BC—pigmented polyester melamine, sprayed and flashed 3 min before CC application; ~25 µm DFT CC—acrylosilane, sprayed, flashed for 15 min., cured for 35 min @ 265° F.; ~50 µm DFT

EXAMPLES

Examples 1 to 12

Particle Composition

The corrosion performance was tested using the salt mist cyclic test method. Cold rolled steel (CRS) panels treated with zinc phosphate (Code: APR 12936, ACT Laboratories, Hillsdale, Mich.) were coated by fluidized bed application, to a thickness of 25 µm±2.5 µm. The polymers used (Nucrel®) had a melt index (MI) of 1000, and were copolymers of polyethylene with either methacrylic acid (MAA) or acrylic acid (AA). The acid level stated in the following table is percent by weight of acid to ethylene polymer. The acid level was adjusted in the reactor where the copolymers were made under high pressure gas phase polymerization.

Unless otherwise specified, the metallic panels were preheated before the application of the particles in a fluidized bed. The panel is then post-heated for a specified length of time. These parameters are shown in the Tables below.

TABLE 1

| Example No. | Acid Type | Acid Level, Percent | Corrosion, mm |
|---|---|---|---|
| 1 | AA | 3 | 50 |
| 2 | AA | 4.5 | 30 |
| 3 | AA | 6 | 4 |
| 4 | AA | 8 | 10 |
| 5 | AA | 10 | 10 |
| 6 | AA | 16 | 20 |
| 7 | MAA | 3 | 45 |
| 8 | MAA | 4.8 | 14 |
| 9 | MAA | 7 | 8 |
| 10 | MAA | 10 | 11 |
| 11 | MAA | 12 | 24 |
| 12 | MAA | 18 | 20 |

Examples 13 to 17

TABLE 2

Acid Level v. Melt Index (MI) of Nucrel ® and Corrosion

| Ex. No. | Acid Used With Nucrel ® | Percent Acid | Melt Index | Corrosion, mm |
|---|---|---|---|---|
| 13 | MAA | 8 | 10 | 6.5 |
| 14 | MAA | 15 | 60 | 14 |
| 15 | MAA | 10 | 500 | 7 |
| 16 | MAA | 10 | 850 | 8 |
| 17 | AA | 10 | 2000 | 8 |

Example 18

Particle Coating Study; Coated with BC/CC; Epoxy=TGIC, Catalyst=TBPB, Nucrel® with MAA CRS panels were treated as described above, and coated with particles (epoxy=TGIC, catalyst=TBPB) wherein the Nucrel® used was a copolymer of MAA. The panels were preheated at 110° C., coated in the fluidized bed, then post-heated at 150° C. for 6 minutes. They were then coated with BC/CC. The coated panels were subsequently tested via gravelometer, receiving a rating of "8". Humidity adhesion testing results were "0", and after 1000 hr salt spray, showed 2 mm corrosion.

Example 19

Nucrel®+Bisphenol A+TBPB; 1:1 Stoichiometry, 0.5 percent Catalyst, Preheat=100° C., Postheat=120–180° C., Postheat time 5–30 minutes CRS panels were treated as described above, and then coated with Nucrel® containing bisphenol A epoxy (1:1 Stoichiometry) with 0.5% TBPB catalyst. Preheat temperature was 100° C., post-heat temperature was 180° C. for 30 min. The coating thickness as 1.7 mils. Half the panels were coated with PS/BC/CC. Gravelometer results were 9 for both coated and uncoated, humidity adhesion rating of 0 for both, no salt spray corrosion after 1000 hr for both, and no shrinkage noted for the PS/BC/CC-coated panels.

Examples 20 to 22

Nucrel® with Various Epoxies and with TBPB catalyst; Corrosion and Viscosity

CRS panels were prepared as described above, and the epoxies used and the test results are shown in the Table below. The viscosity was measured by pressing a film of the mixture and measuring the viscosity in a parallel plate viscometer at 150° C. at 10 rad/s for approximately 30 minutes.

TABLE 3

| Ex. No. | Epoxy | Corrosion, mm Uncoated | Coated* | Viscosity, Paschals 5 min | 15 min | 30 min. |
|---|---|---|---|---|---|---|
| 20 | GT7097 | 5.2 | 5.4 | 138 | 302 | 3382 |
| 21 | GT6703 | 5.2 | 4.9 | 577 | 2025 | 2591.9 |
| 22 | GT7013 | 2.4 | 2.5 | 382 | 1654.2 | |

*Coated with PS/BC/CC

Example 23

Measurement of Viscosity/Crosslinking/Creep

In this Example, a brabender mixer was first charged with Nucrel® with 10% MAA, then epoxy (TGIC, 5.7 g), followed by catalyst (TBPB, 0.5%). Time was counted from the time of the introduction of the catalyst. The RPM was set at 50 and the temperature at 160° C. The product was obtained as a mixture which was cooled in liquid nitrogen. The torque was measured at 200 units, and is an indicator of viscosity, which in turn is an indicator of the extent of crosslinking as well as creep/shrink.

Examples 24 to 25

Primer (Nucrel®) treated with metal salt to form ionomer and subsequent testing via gravelometer, humidity and salt spray.

Panels were prepared in a fluidized bed as described above. The coated panels were dipped in a 1% solution of either ZnAc or AlAcAc. Gravelometer, humidity adhesion and salt spray (1000 hr) test results are shown below.

| Ex. No. | Primer | Treatment | Gravel. | Humid. | 1000 hr Salt Spray, mm |
|---|---|---|---|---|---|
| 24 | Nucrel | 1% ZnAc | 9(P/T) | 5 to 15 | 5 |
| 25 | Nucrel | 1% Alacac | 9(P/T) | 5 to 15 | 8 |

Examples 26 to 29

Corrosion, adhesion and gravelometer tests of Nucrel® RX76 after neutralization by ion bath dipping. Data are reported in Table 4 for various dipping times in minutes.

TABLE 4

Neutralization Obtained by Dipping in Ion Baths

| Ex. No. | Dipping Time, min | Adhesion | Corrosion mm | Gravel. |
|---|---|---|---|---|
| 26[1] | 0 | 0 | 16 | 7 |
| 27[1] | 60 | 0 | 5 | 9 |
| 28[2] | 5 | 9 | 6 | 9 |
| 29[3] | 0 | 0 | 100 | 7 |

[1]-10 wt percent ZnAc in water
[2]-10 wt percent AlAcAc in Butanol
[3]-10 wt percent NaOH in water Examples 30 to 32

Nucrel® with various pigments at various P/B's: corrosion, creep and viscosity studies. Method "A" is the humidity test, and Method "B" is the salt mist cyclic test. "Coated" means the panels are further coated with PS/BC/CC. "Uncoated" means only the fluidized-bed-applied coating of the particles has been applied to the metal substrate.

| | Pigmentation | | 1000 hrs Corrosion | | | | |
|---|---|---|---|---|---|---|---|
| Ex. No. | Pigment | P/B | "A" Coated | Un- coated | "B" Coated | Shrin- kage mm | Vis- cosi- ty Pas- chals |
| 30 | Halox ® | 5 | 0.375 | 3.5 | 0.825 | 2.5 | 29.8 |
| 31 | BaSO₄ | 10 | 0.425 | 2.3 | 1.05 | 3 | 34 |
| 32 | CaCO₃ | 10 | 100 | 100 | 100 | | 56.4 |

Examples 33 to 35

The data show the results of systems which are neutralized and which contain anticorrosive pigment. "SS" indicates "salt spray" test.

TABLE 5

| Ex. No. | Sample Descrip- tion | Thick- ness mils | Gravel. | Humid. | Coated with PS/BC/CC 1000 hrSS | Uncoated Nucrel ® 1000 hrSS |
|---|---|---|---|---|---|---|
| 33 | 2 percent Nalzin ® 2, ZnAc, 5 min | 1.4 | 8 | 0 | 3 | 1 |
| 34 | 2 percent Nalzin ® 2, AlAcAc, 5 min | 1.6 | 9 | 15 to 35 | 68 | 24 |
| 35 | 2 percent Halox ®, ZnAc, 5 min | 1.5 | 8 | 0 | 2 | 4 |

What is claimed is:

1. A process for controlling the anticorrosion and substrate-adherence properties of a coating prepared from a particulate polymer composition, said process comprising:

i) selecting for said composition a particulate polymer having a carboxyl functionality in excess of a desired range of about 2 to 16 percent based on the weight of the polymer;

ii) applying said coating from a fluidized bed or by electrostatic spraying on a substrate; and iii) adjusting content of said carboxyl functionality of the polymer in said coating within the desired range for said controlling of said anticorrosion and substrate-adherence properties of said coating.

2. The process according to claim 1 wherein said step for adjusting the content of said carboxyl functionality of said particulate polymer within said desired range comprises capping said excess of said carboxyl functionality.

3. The process according to claim 1 wherein said step for adjusting the content of said carboxyl functionality of said particulate polymer within said desired range comprises crosslinking said excess of said carboxyl functionality.

4. The process according to claim 1 wherein said step for adjusting the content of said carboxyl functionality of said particulate polymer within said desired range comprises neutralizing said excess of said carboxyl functionality.

5. The process according to claim 1 wherein said excess of said carboxyl functionality varies between 2.5 to 24 percent based on the weight of the polymer.

6. A process for controlling the anticorrosion and substrate-adherence properties of a coating prepared from a particulate polymer composition, said process comprising:

selecting for said composition a particulate polymer containing a carboxyl functionality in a desired range of about 2 to 16 percent based on the weight of the polymer for said controlling of said anticorrosion and substrate-adherence properties of said coating; and applying said coating on a substrate from a fluidized bed or by electrostatic spraying.

7. The process according to claim 1 or 6 comprising adjusting said content within the range of about 4 to 12 percent based on the weight of the polymer.

8. The process according to claim 1 or 6 comprising adjusting said content within the range of about 2 to 9 percent based on the weight of the polymer to enhance the anticorrosion property of the coating.

9. The process according to claim 1 or 6 comprising adjusting said content within the range of about 5 to 16 percent based on the weight of the polymer to enhance the substrate-adherence of the coating.

10. The process according to claim 1 or 6 comprising adjusting said content within the range of about 5 to 9 percent based on the weight of the polymer to effect an overall balance of both the anticorrosion and the substrate-adherence of the coating.

11. The process according to claim 1 or 6 further comprising adding at least one anticorrosive pigment to said composition for improving the anticorrosion property of the coating.

12. The process according to claim 11 wherein the anticorrosive pigment is selected from the group consisting of $BaSO_4$, zinc phospho oxide complex, calcium strontium zinc phosphosilicate, and a combination thereof.

13. A process according to claim 12 wherein the anticorrosive pigment is $BaSO_4$ employed at a pigment to binder weight ratio of 2:100 to 30:100.

14. The process according to claim 1 or 6 wherein said carboxyl functionality on said particulate polymer is in the form of an anhydride moiety.

15. The process according to claim 14 comprising hydrolyzing said anhydride moiety of said particulate polymer.

16. The process according to claim 1 or 6 wherein said particulate polymer is a semicrystalline particulate polymer.

17. The process according to claim 16 further comprising crosslinking or neutralizing at least about 0.5 percent based on weight of the polymer of the carboxyl functionality for enhancing the creep resistance of said composition.

18. A process for controlling the anticorrosion and substrate-adherence properties of a self supporting film prepared from a particulate polymer composition, said process comprising:

i) selecting for said composition a particulate polymer having a carboxyl functionality in excess of a desired range of about 2 to 16 percent based on the weight of the polymer;

ii) applying a layer of said composition from a fluidized bed or by electrostatic spraying on a dimensionally stable substrate;

iii) heating and curing said layer to form said film;

iv) removing said film from said substrate;

v) adjusting content of said carboxyl functionality of the polymer in said film within the desired range for said controlling of said anticorrosion and substrate-adherence properties of said film.

19. The process of claim 18 wherein said substrate is coated with a release agent.

* * * * *